(12) United States Patent
Kannan et al.

(10) Patent No.: US 9,946,238 B2
(45) Date of Patent: Apr. 17, 2018

(54) ELECTRONIC WEARABLE ACTIVITY IDENTIFIER AND ENVIRONMENTAL CONTROLLER

(71) Applicant: Honeywell International Inc., Morristown, NJ (US)

(72) Inventors: Kamal Kannan, TamiNadu (IN); Savari Raj, TamilNadu (IN); Arumugakumar Mookan, TamilNadu (IN); Deepak S, TamilNadu (IN); Balaji Sambamoorthy, TamilNadu (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 236 days.

(21) Appl. No.: 14/725,173

(22) Filed: May 29, 2015

(65) Prior Publication Data

US 2016/0349719 A1    Dec. 1, 2016

(51) Int. Cl.
| G05B 15/02 | (2006.01) |
| G06F 1/16 | (2006.01) |
| H04L 12/28 | (2006.01) |
| G08B 19/00 | (2006.01) |

(52) U.S. Cl.
CPC ............. G05B 15/02 (2013.01); G06F 1/163 (2013.01); H04L 12/2823 (2013.01); G08B 19/005 (2013.01)

(58) Field of Classification Search
None
See application file for complete search history.

(56) References Cited

U.S. PATENT DOCUMENTS

| 8,028,405 B2 * | 10/2011 | Nolleck ................ G01B 11/26 29/739 |
| 8,374,725 B1 * | 2/2013 | Ols ...................... F24F 11/0012 261/118 |
| 9,207,659 B1 * | 12/2015 | Sami ...................... G05B 15/02 |
| 9,600,645 B2 * | 3/2017 | Fadell .................. G08B 27/003 |
| 9,800,429 B2 * | 10/2017 | Crayford ............. H04L 12/2803 |
| 2002/0060630 A1 | 5/2002 | Power |
| 2004/0148632 A1 * | 7/2004 | Park ................... H04N 5/44582 725/81 |
| 2012/0083705 A1 | 4/2012 | Yuen et al. |
| 2013/0054033 A1 | 2/2013 | Casilli |

(Continued)

OTHER PUBLICATIONS

A Simple Wristband That Controls Every Gadget in Your House; by Ashley Feinberg; Published on Jun. 27, 2014; printed from the Internet on Apr. 20, 2017; 5 pages.*

(Continued)

*Primary Examiner* — Ronald Hartman, Jr.
(74) *Attorney, Agent, or Firm* — Husch Blackwell LLP

(57) ABSTRACT

An apparatus is provided that includes an automation system that detects threats within a secured geographic area, a wireless wearable device worn by a human user that detects activities of the user, and a processor of the automation system that wirelessly receives the detected activities of the human user from the wearable device as the user enters the secured area, that associates at least one of the detected activities with a predetermined action, and that automatically implements a physical change within the secured area in support of the predetermined action.

18 Claims, 1 Drawing Sheet

(56) References Cited

U.S. PATENT DOCUMENTS

| | | | |
|---|---|---|---|
| 2015/0022347 A1 | 1/2015 | Aswath et al. | |
| 2015/0057808 A1* | 2/2015 | Cook | G05B 13/04 |
| | | | 700/275 |
| 2015/0142141 A1 | 5/2015 | Okabayashi et al. | |
| 2015/0241860 A1* | 8/2015 | Raid | G05B 15/02 |
| | | | 700/275 |
| 2015/0320588 A1* | 11/2015 | Connor | A61F 7/0097 |
| | | | 607/107 |
| 2015/0331396 A1* | 11/2015 | Sami | G05B 15/02 |
| | | | 700/275 |
| 2016/0217631 A1* | 7/2016 | Petricoin, Jr. | G07C 9/00007 |
| 2016/0234034 A1* | 8/2016 | Mahar | H04L 12/282 |

OTHER PUBLICATIONS

Jawbone's New Wristband Adds You to the Internet of Things; by Rachel Metz; Published on Nov. 2013; Printed from Internet on Apr. 20, 2017; 4 pages.*

WristQue wireless bracelet offers smart home motion control; by Chris Davies; Published on Jan. 17, 2012; Printed from Internet on Apr. 20, 2017; 4 pages.*

Extended European search report for corresponding EP patent application 16169252.0, dated Oct. 27, 2016.

* cited by examiner

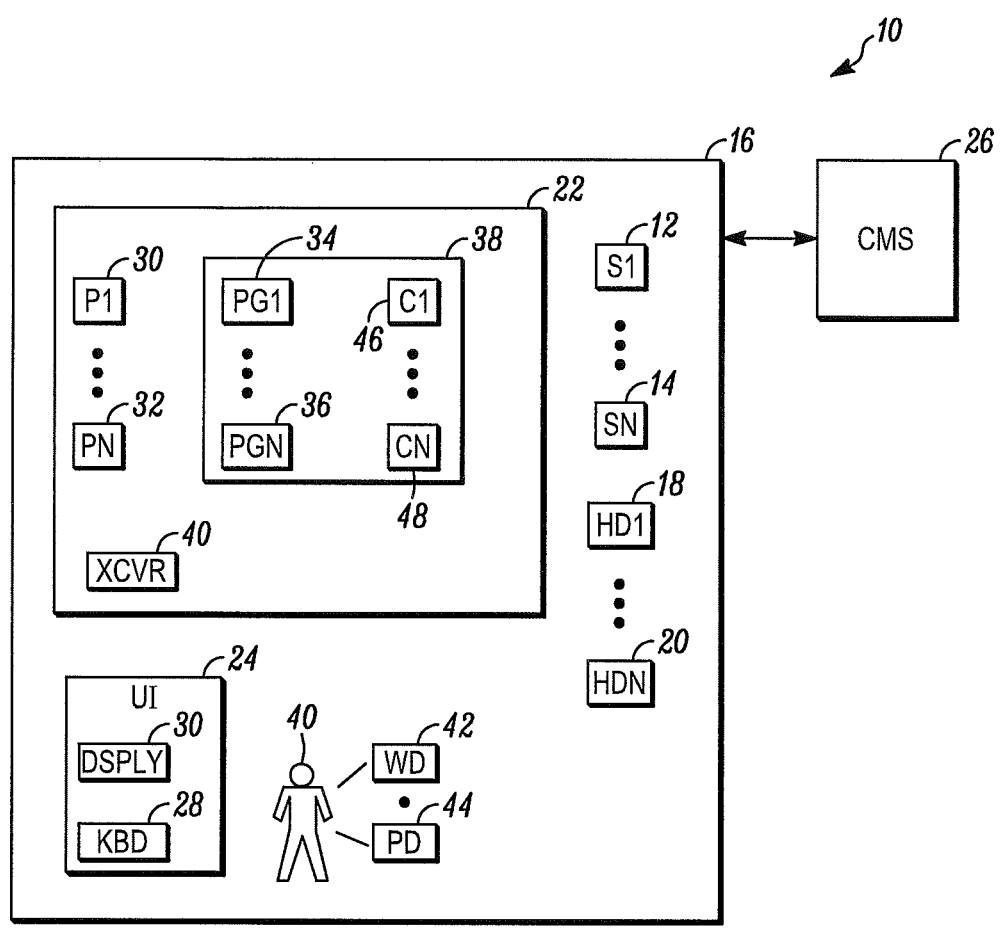

ELECTRONIC WEARABLE ACTIVITY IDENTIFIER AND ENVIRONMENTAL CONTROLLER

FIELD

This application relates to home automation systems and, more particularly, to methods of controlling such systems.

BACKGROUND

Home automation systems that serve and protect people and assets within secured areas (e.g., a home or other residence) are known. Such systems are typically based upon the use of one or more controlled devices and may include one or more sensors that detect threats within an area.

Threats to people and assets may originate from any of a number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within the area. Intruders have also been known to injure or kill people living within the area.

In the case of intruders, sensors may be placed in different areas based upon the respective uses of those areas. For example, if people are present during some portions of a normal day and not at other times, then sensors may be placed along a periphery of a space to provide protection while the space is occupied while additional sensors may be placed within an interior of the space and used when the space is not occupied.

In most cases, threat sensors are connected to a local control panel. In the event of a threat detected via one of the sensors, the control panel may sound a local audible alarm. The control panel may also send a signal to a central monitoring station.

While home automation systems work well, they are sometimes difficult to use, especially where a user must enter instructions through a control panel. Accordingly, a need exists for better methods and interfaces for controlling such systems.

BRIEF DESCRIPTION OF THE DRAWINGS

FIG. 1 illustrates a block diagram of a home system in accordance herewith.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

FIG. 1 is a block diagram of a home automation system 10 shown generally in accordance with an illustrated embodiment. The home automation system may provide a number of different benefits to an authorized human user, including automation of home heating/cooling systems, home security, etc. For example, in the context of home security, the system may include a number of sensors 12, 14 that detect threats within a secured geographic area 16 that defines a home or other residence of the user.

The sensors may be embodied in any of a number of different forms. For example, one or more of the sensors may include limit switches placed upon doors and windows along a periphery of the secured area that detect intruders. Alternatively, some of the sensors may be passive infrared (PIR) sensors placed within an interior of the area that are intended to detect intruders who have been able to circumvent the sensors placed along the periphery. Still other of the sensors may be environmental sensors (e.g., smoke detectors, carbon monoxide detectors, etc.).

Also included within the secured area may be a number of home automation devices 18, 20. The home automation devices are interfaces that control various devices located within the home. For example, one of the home automation devices may be an interface that controls a heating and/or cooling system of the home. Another home automation device may raise and lower the temperature of a water heater of the home. Still another home automation device may activate and deactivate a home entertainment system.

The home automation system may be controlled via a control panel 22 and a user interface 24. For example, the control panel may monitor each of the sensors for activation. Upon activation of one of the sensors, the control panel may send an alarm message to a central monitoring station 26. Upon receipt of an alarm message, the central monitoring station may summon the appropriate help (e.g., police, fire department, etc.).

A security system portion of the home automation system may be armed and disarmed via the user interface. In this regard, the user may enter a personal identification number (PIN) via a keyboard 28. Status information may be shown on a display 30. Similarly, the home automation devices may be controlled via the user interface.

Included within the control panel and other devices described below may be one or more processor apparatuses (processors) 30, 32 each controlled by one or more computer programs 34, 36 loaded from a non-transitory computer readable medium (memory) 38. As used herein, reference to a step performed by a computer program is also reference to the processor that executed that step.

The sensors and home automation devices may be connected to the control panel by wires or wirelessly. Where the connection is wireless, the control panel and each of the sensors and home automation devices include a radio frequency transceiver 40.

Included within the home automation system is a wireless wearable device 42 carried by the user 40. The wearable device may be embodied in any of a number of different forms (e.g., Samsung gear, Google glass, etc.). Alternatively, the wearable device may be a WiFi or Bluetooth enabled wristband.

The user may also carry a portable cellular device (e.g., a smart phone) 44. The portable cellular device may include a GPS device that provides location information to the wearable device. The smart phone may also operate to relay information from the wearable device to the control panel.

In general, a processor of the wearable device operates to monitor activities of the user both within the secured area and outside of the secured area. As each activity is detected, the processor of the wearable device saves a record of that activity in memory. Each time the user enters the secured area, the wearable device downloads the detected activities to the control panel. The downloaded activity information is analyzed and used to control the home automation system.

For example, a processor of the wearable device may detect a visit to a gym by the user for a workout. The processor may detect the visit by monitoring physiological parameters (e.g., heart rate, respiration, etc.) of the user or by determining a current geographic location of the user and comparing the current location with a number of previously saved locations.

In some cases, the activity may be inferred from a location of the user. For example, a location of a place of work of the user may be saved. Upon detection of entry into the place of work, the wearable device may save an at-work entry, a time of the activity, and a duration.

Alternatively, the wearable device (e.g., Google glass) may track the Internet activities of the user and save a record of the activities. For example, each of the like/unlike comments of the user on social networking sites (e.g., Facebook, wats app, etc.) may be detected, captured, and saved as separate activities in an activity log.

Located within the memory of the control panel may be a set of criteria defined within a respective file 46, 48 for implementing a change to the area via the home automation system. In each case, the criteria may define an activity, a location, or an inferred state of mind of the user based upon the activity.

For example, one criteria may be defined by the user for each visit by the user to the gym for a workout. In this case, the activity may be followed by some predetermined action, such as the user returning home to take a shower. In anticipation of the activity, the user may program the system to raise the temperature of a water heater so that the user can take a warm shower after his/her workout.

The user can create any of a number of different criteria that may trigger or otherwise cause the home automation system to make some physical change within the secured area upon the user returning home. For example, if the user were to spend a long day at work, then the home automation system may automatically activate a home entertainment system after the user returns home and after the home automation system downloads the user's activities during the day. Similarly, if the monitored activities were to include a series of social network interactions where the user were to enter a number of don't like responses, then the system may conclude that the user is tense and/or irritable and execute some predetermined physical response, such as lowering a set point of an air conditioner on a hot summer day to provide a cool environment for the user so that the user is able to unwind or otherwise relax.

In general, the system includes an activities processor that constantly monitors the activity of the user via the wearable device. The same or another processor may detect entry by the user into the secured area and automatically download a record of a day's activities to a monitoring processor within the home automation system.

Upon receiving the record of the detected activities, the monitoring processor may compare the activities with the criteria found in each criteria file. Upon detecting a match, the monitoring processor may retrieve instructions for making some corresponding physical change within the secured area. The retrieved instructions may be automatically executed to activate a control module or switch that implements the desired physical change.

In general, the system includes an automation system that detects threats within a secured geographic area, a wireless wearable device worn by a human user that detects activities of the user, and a processor of the automation system that wirelessly receives the detected activities of the human user from the wearable device as the user enters the secured area, that associates at least one of the detected activities with a predetermined action, and that automatically implements a physical change within the secured area in support of the predetermined action.

Alternatively, the system includes an automation system that detects threats within a secured geographic area, a wireless wearable device carried by a human user that detects activities of the user, and a processor of the automation system that wirelessly receives the detected activities of the human user from the wearable device within the secured area, matches the detected activities with a criteria, and automatically implements a physical change within the secured area based upon a match.

Alternatively, the system includes an automation system that detects threats within a secured geographic area, a wireless portable device carried by a human user that detects activities of the user, and a processor of the automation system having a plurality of criteria saved in a memory of the processor, wherein the processor wirelessly receives the detected activities of the human user from the portable device within the secured area, matches the detected activities with one of the plurality of criteria, and automatically implements an environmental change within the secured area based upon a match.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the FIGURE do not require the particular order shown or sequential order to achieve desirable results. Other steps may be provided, steps may be eliminated from the described flows, and other components may be added to or removed from the described embodiments.

The invention claimed is:

1. An apparatus comprising:
an automation system that detects threats within a secured area;
a wireless wearable device that detects activities;
a processor of the automation system that wirelessly receives the activities from the wireless wearable device as the wireless wearable device enters the secured area and that retrieves and implements a predetermined action associated with at least one of the activities, wherein the predetermined action includes a physical change within the secured area; and
a portable mobile device that wirelessly connects to the wireless wearable device, wherein the portable mobile device determines a respective physical location of each of the activities.

2. The apparatus as in claim 1 wherein the wireless wearable device monitors physiological parameters to detect the activities, and wherein the physiological parameters indicate that the at least one of the activities includes a visit to a gym for a workout.

3. The apparatus as in claim 2 wherein the predetermined action associated with the visit to the gym includes taking a shower, and the physical change includes raising a temperature of a water heater in anticipation of the shower.

4. The apparatus as in claim 1 wherein the at least one of the activities is associated with a place of work for a user of the wireless wearable device.

5. The apparatus as in claim 4 wherein the predetermined action associated with the place of work includes the user relaxing at an end of work, and the physical change includes activating a home entertainment center within the secured area.

6. The apparatus as in claim 4 wherein the predetermined action associated with the place of work includes the user relaxing at an end of work, and the physical change includes changing a heating or cooling setting for the secured area.

7. The apparatus as in claim 1 wherein the wireless wearable device is selected from one of Samsung gear, Google glass, and a WiFi or Bluetooth wrist worn device.

8. An apparatus comprising:
an automation system that detects threats within a secured area;
a wireless wearable device that detects activities;
a processor of the automation system that wirelessly receives the activities from the wireless wearable device when the wireless wearable device is within the secured area, evaluates the activities to determine a match with a criteria, and automatically implements a first of a plurality of physical changes within the secured area based upon the match; and
a portable mobile device that wirelessly connects to the wireless wearable device, wherein the portable mobile device determines a respective physical location of each of the activities.

9. The apparatus as in claim 8 wherein the wireless wearable device is selected from one of a Samsung gear device, a Google glass device, and a WiFi or Bluetooth wristband.

10. The apparatus as in claim 8 wherein the processor of the automation system determines a mood of a user of the wireless wearable device based a set of web interactions of the user.

11. The apparatus as in claim 8 wherein the first of the plurality of physical changes includes a change in an environmental parameter of the secured area.

12. The apparatus as in claim 11 wherein the environmental parameter includes a temperature set point.

13. The apparatus as in claim 8 wherein the physical change includes activating a home entertainment system.

14. The apparatus as in claim 8 wherein evaluating the activities to determine the match with the criteria includes searching a plurality of criteria, each of which is associated with a particular one of the activities and a different one of the plurality of physical changes within the secured area.

15. An apparatus comprising:
an automation system that detects threats within a secured area;
a wireless wearable device that detects activities;
a processor of the automation system having a plurality of criteria saved in a memory of the processor, wherein the processor wirelessly receives the activities from the wireless wearable device when the wireless wearable device is within the secured area, evaluates the activities to determine a match with one of the plurality of criteria, and automatically implements an environmental change within the secured area based upon the match; and
a portable mobile device that wirelessly connects to the wireless wearable device, wherein the portable mobile device determines a respective physical location of each of the activities.

16. The apparatus as in claim 15 wherein the environmental change includes a temperature change of heating or air conditioning.

17. The apparatus as in claim 15 wherein the environmental change includes activation of a home entertainment system.

18. The apparatus as in claim 15 wherein the processor of the automation system monitors a social networking site for the activities.

* * * * *